US010425397B2

(12) United States Patent
Matsumura

(10) Patent No.: US 10,425,397 B2
(45) Date of Patent: Sep. 24, 2019

(54) INFORMATION PROCESSING SYSTEM, INFORMATION PROCESSING APPARATUS, AND NON-TRANSITORY COMPUTER READABLE RECORDING MEDIUM STORING INFORMATION PROCESSING PROGRAM

(71) Applicant: FUJI XEROX CO., LTD., Tokyo (JP)

(72) Inventor: Ryoji Matsumura, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 334 days.

(21) Appl. No.: 15/220,041

(22) Filed: Jul. 26, 2016

(65) Prior Publication Data
US 2017/0214686 A1 Jul. 27, 2017

(30) Foreign Application Priority Data
Jan. 21, 2016 (JP) .................................. 2016-010001

(51) Int. Cl.
*H04L 29/06* (2006.01)
*H04L 9/32* (2006.01)

(52) U.S. Cl.
CPC ........ *H04L 63/0823* (2013.01); *H04L 9/3247* (2013.01); *H04L 9/3268* (2013.01); *H04L 63/20* (2013.01)

(58) Field of Classification Search
CPC .................... H04L 63/0823; H04L 9/3247
USPC .......................................................... 713/156
See application file for complete search history.

(56) References Cited

U.S. PATENT DOCUMENTS

| 7,383,434 | B2* | 6/2008 | Wildish | G06Q 30/06 380/282 |
| 8,850,208 | B1* | 9/2014 | Parkinson | H04L 9/3265 709/225 |
| 2002/0108041 | A1* | 8/2002 | Watanabe | H04L 9/3252 713/175 |
| 2006/0259762 | A1* | 11/2006 | Tanimoto | H04L 63/0823 713/156 |
| 2007/0016783 | A1* | 1/2007 | Saito | H04L 9/3247 713/175 |
| 2008/0162933 | A1* | 7/2008 | Okada | H04L 63/0428 713/168 |
| 2009/0217047 | A1* | 8/2009 | Akashika | G06F 21/33 713/175 |

(Continued)

FOREIGN PATENT DOCUMENTS

JP 5397019 B2 1/2014

OTHER PUBLICATIONS

Beverly Schwartz,; Smart Packets: Applying Active Networks to Network Management; ACM Transactions on Computer Systems, vol. 18, No. 1, Feb. 2000, pp. 67-88.*

*Primary Examiner* — Monjur Rahim
(74) *Attorney, Agent, or Firm* — Oliff PLC

(57) ABSTRACT

An information processing apparatus includes; a generator that generates an instruction for a terminal used by an administrator of the information processing apparatus to verify a first electronic certificate whose verification has failed; a transmitter that transmits information indicating the first electronic certificate and the instruction to the terminal used by the administrator of the information processing apparatus; and a setting unit that, when an instruction to set a second electronic certificate is received from the terminal, sets the second electronic certificate.

4 Claims, 11 Drawing Sheets

(56) References Cited

U.S. PATENT DOCUMENTS

| | | | | |
|---|---|---|---|---|
| 2010/0306545 | A1* | 12/2010 | Seki | G06Q 10/107 |
| | | | | 713/175 |
| 2013/0227275 | A1* | 8/2013 | Satoh | H04L 63/0823 |
| | | | | 713/156 |
| 2014/0195800 | A1* | 7/2014 | Sabin | H04L 9/3268 |
| | | | | 713/156 |
| 2014/0359281 | A1* | 12/2014 | Saboori | H04L 63/0823 |
| | | | | 713/156 |
| 2015/0222643 | A1* | 8/2015 | Sharif | H04L 63/123 |
| | | | | 713/155 |
| 2015/0341353 | A1* | 11/2015 | Zhou | H04L 63/0823 |
| | | | | 713/175 |

\* cited by examiner

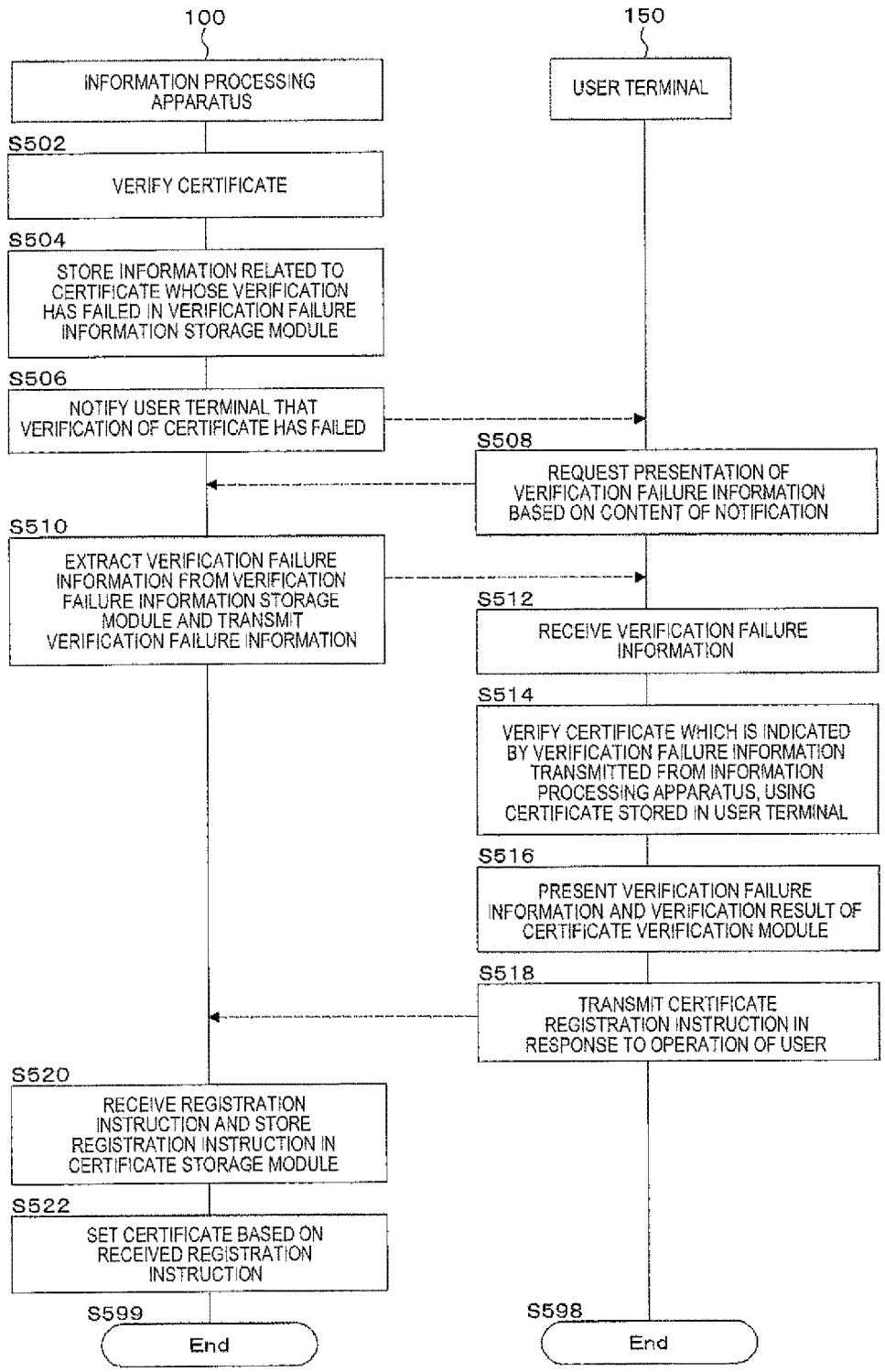

SCANNING IS AVAILABLE.
[ STORAGE DESTINATION ] ¥¥scan.ffffxxxxx.com¥scan¥scan
[ PROTOCOL ] SMB

REMAINING MEMORY SPACE 100%

610

| SCANNER STORAGE IN PC | ADJUSTMENT OF IMAGE QUALITY | READING METHOD | OUTPUT FORMAT |

SERVER: scan.ffffxxxxx.com
SHARED NAME: scan
STORAGE POSITION: scan
USER NAME: user
PASSWORD: ***

! SECURITY IS TEMPORARILY ALLOWED

INVALID CERTIFICATE WAS NOTIFIED.

DO YOU WANT TO TEMPORARILY PERFORM COMMUNICATION WITH VALID CERTIFICATE?

YES    NO

FIG.7

| OCCURRENCE DATE AND TIME | OPERATOR | FUNCTION | CERTIFICATE ISSUER | CERTIFICATE INFORMATION | VERIFICATION RESULT OF PC BROWSER | REGISTRATION INSTRUCTION |
|---|---|---|---|---|---|---|
| 2015/6/23 13:24 | user4 | SCANNER (STORAGE IN PC) | VvvvSsss.com | 564bc539c2a9... | ○ VERIFICATION BY PC OK | REGISTRATION |
| 2015/6/23 15:21 | user17 | SCANNER (MAIL) | Gggggg5sss.com | 75ea9e2803d2... | ○ VERIFICATION BY PC OK | REGISTRATION |
| 2015/6/24 9:47 | | AUTOMATIC FACSIMILE RECEPTION | 192.168.1.2 | aa0e74459b926... | × VERIFICATION BY PC NG | REGISTRATION |
| 2015/6/27 20:12 | user24 | CUSTOM SERVICE 2 | VvvvCccc.com | c2a95675ea19... | ○ VERIFICATION BY PC OK | REGISTRATION |

FIG.8A

600 — REMAINING MEMORY SPACE 100%

SCANNING IS AVAILABLE.
[STORAGE DESTINATION] ¥¥scan.ffffxxxxx.com¥scan¥scan
[PROTOCOL] SMB 610 — | SCANNER STORAGE IN PC | ADJUSTMENT OF IMAGE QUALITY | READING METHOD | OUTPUT FORMAT |

| SERVER | scan.ffffxxxxx.com |
| SHARED NAME | scan |
| STORAGE POSITION | scan |
| USER NAME | user |
| PASSWORD | **** |

FIG.8B

850 — REMAINING MEMORY SPACE 99%

CONTINUOUSLY READING IS AVAILABLE.
PLEASE SET NEXT DOCUMENT AND PRESS [START] BUTTON.

STORAGE IN BOX          DOCUMENT NUMBER  0003

STORAGE DESTINATION : CONFIDENTIAL BOX 001 (NAME UNSET)
DOCUMENT NAME : 20150625140908

PAGE : 1

A4

PREVIEW...

STOP
STORE (NO NEXT DOCUMENT)
NEXT DOCUMENT
START READING
CHANGE SETTING OF READING...

INFORMATION PROCESSING SYSTEM, INFORMATION PROCESSING APPARATUS, AND NON-TRANSITORY COMPUTER READABLE RECORDING MEDIUM STORING INFORMATION PROCESSING PROGRAM

CROSS-REFERENCE TO RELATED APPLICATIONS

This application is based on and claims priority under 35 USC 119 from Japanese Patent Application No. 2016-010001 filed on Jan. 21, 2016.

BACKGROUND

The present invention relates to an information processing system, an information processing apparatus, and a non-transitory computer readable recording medium storing an information processing program.

SUMMARY

An aspect of the invention provides an information processing system including:
an information processing apparatus; and
a terminal,
wherein the information processing apparatus includes:
a generator that generates an instruction for the terminal used by an administrator of the information processing apparatus to verify a first electronic certificate whose verification has failed;
a transmitter that transmits information indicating the first electronic certificate and the instruction to the terminal used by the administrator of the information processing apparatus; and
a setting unit that, when an instruction to set a second electronic certificate is received from the terminal, sets the second electronic certificate, and
the terminal includes:
a receiver that receives the information indicating the first electronic certificate and the instruction from the information processing apparatus;
a verification unit that verifies the first electronic certificate based on the instruction;
a presentation unit that presents the information indicating the first electronic certificate and a verification result of the verification unit; and
a transmitter that transmits the instruction to set the second electronic certificate used to verify the first electronic certificate to the information processing apparatus in response to an operation of the administrator.

An aspect of the present invention provides an information processing apparatus including:
a generator that generates an instruction for a terminal used by an administrator of the information processing apparatus to verify a first electronic certificate whose verification has failed;
a transmitter that transmits information indicating the first electronic certificate and the instruction to the terminal used by the administrator of the information processing apparatus; and
a setting unit that, when an instruction to set a second electronic certificate is received from the terminal, sets the second electronic certificate.

An aspect of the present invention provides a non-transitory computer readable recording medium storing an information processing program that causes a computer to function as:
a generator that generates an instruction for a terminal used by an administrator of an information processing apparatus including the computer to verify a first electronic certificate whose verification has failed;
a transmitter that transmits information indicating the first electronic certificate and the instruction to the terminal used by the administrator of the information processing apparatus; and
a setting unit that, when an instruction to set a second electronic certificate is received from the terminal, sets the second electronic certificate.

BRIEF DESCRIPTION OF THE DRAWINGS

Exemplary embodiments of the present invention will be described in detail based on the following figures, wherein:

FIG. 5 is a flowchart illustrating an example of a process according to this exemplary embodiment;

FIGS. 6A and 6B are diagrams illustrating an example of a process according to this exemplary embodiment;

FIG. 7 is a diagram illustrating an example of a process according to this exemplary embodiment;

FIGS. 8A and 8B are diagrams illustrating an example of a process according to this exemplary embodiment;

DETAILED DESCRIPTION OF THE PREFERRED EMBODIMENTS

Hereinafter, an example of an exemplary embodiment of the invention will be described with reference to the drawings.

Figure 1:
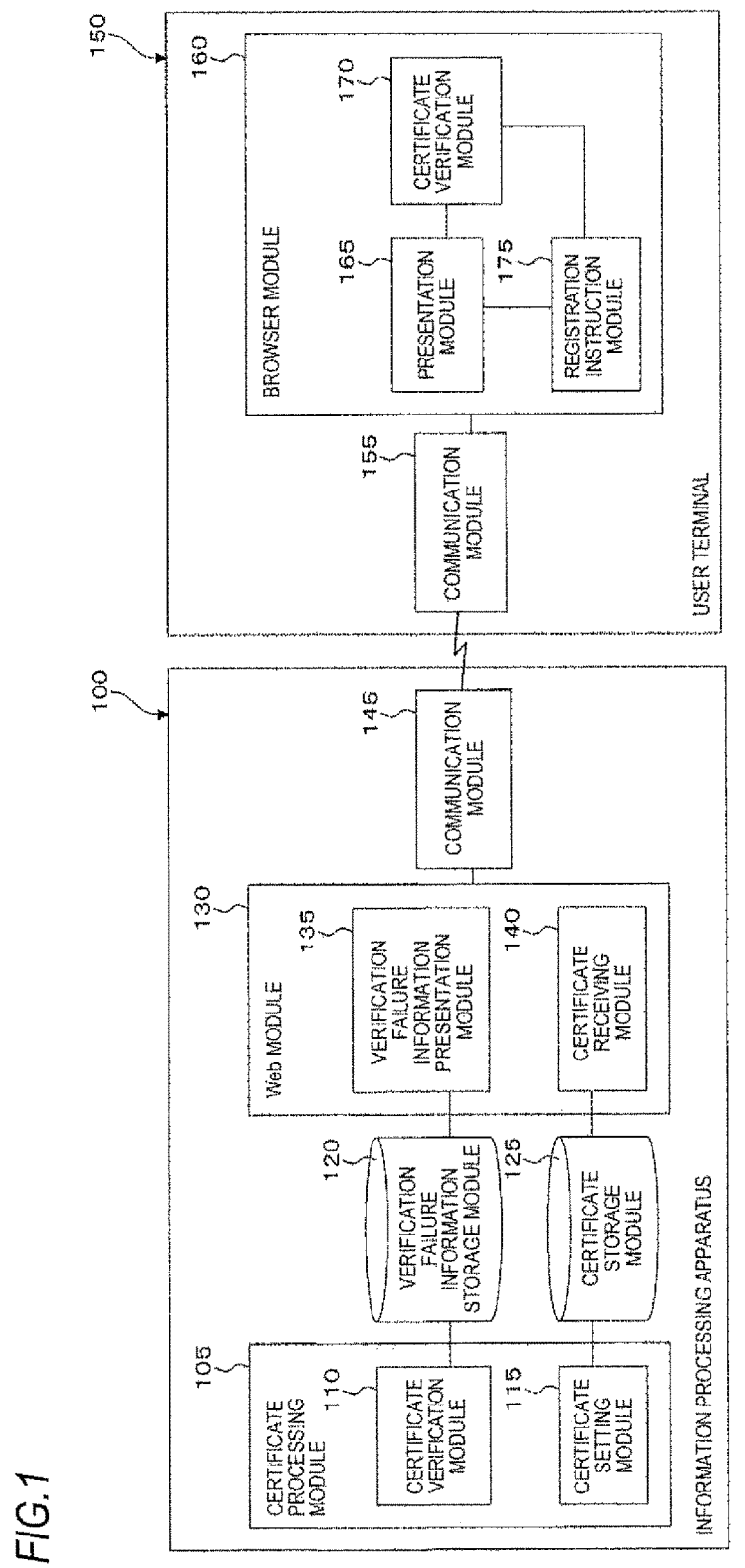
FIG. 1 is a conceptual diagram illustrating an example of the structure of modules according to an exemplary embodiment.

FIG. 1 is a conceptual diagram illustrating an example of the structure of modules according to this exemplary embodiment.

The term "module" refers generally to a component, such as logically separable software (computer program) and hardware. Therefore, a module in this exemplary embodiment indicates not only a module in a computer program but also a module in a hardware configuration. Thus, this exemplary embodiment relates to a computer program (including a program which causes a computer to perform each process, a program which causes a computer to function as each unit, and a program which causes a computer to implement the functions of each unit) that causes a computer to function as modules, a system, and a method. For convenience of description, as used herein, "store", "be stored", or the equivalents thereof mean that a computer program is stored in a storage device or is controlled such that it is stored in a storage device when the exemplary embodiment relates to the computer program. The modules may be in one-to-one correspondence with functions. When modules are mounted, one module may be formed by one program, plural modules may be formed by one program, or one module may be formed by plural programs. Plural modules may be implemented by one computer, or one module may be implemented by plural computers in distributed or parallel environments. One module may include other modules. Hereinafter, the term "connection" includes physical connection and logical connection (for example, the transmission and reception of data, instructions, and the reference relationship between data). The term "predetermined" means being predetermined prior to a target process. The term "predetermined" includes not only determination before a process according to the exemplary embodiment starts but also determination according to situations and conditions at that time or situations and conditions up to that time before a target process after the process according to the exemplary embodiment starts. When there are plural "predetermined values", the predetermined values may be different from each other or two or more values (of course, including all values) may be equal to each other. In addition, the sentence "when A is satisfied, B is performed" means that "if it is determined that A is satisfied, B is performed". However, a case in which it is not necessary to determine whether A is satisfied is excluded.

The term "system" or "apparatus" includes a structure including, for example, one computer, hardware, and a device and a structure in which, for example, plural computers, hardware, and devices are connected to each other by a communication unit, such as a network (including one-to-one correspondence communication connection). In the specification, an "apparatus" is synonymous with a "system". Of course, the "system" does not include anything that is merely a social "structure" (social system) that includes artificial decisions.

For each process by each module or each process when plural processes are performed in a module, target information is read from a storage device and is then processed and the process result is written to the storage device. Therefore, in some cases, the description of reading information from the storage device before the process and writing the process result to the storage device after the process is omitted. The storage device may include, for example, a hard disk, a random access memory (RAM), an external storage medium, a storage device through a communication line, and a register in a central processing unit (CPU).

In an information processing system according to this exemplary embodiment, an information processing apparatus 100 sets an electronic certificate. As illustrated in the example of FIG. 1, the information processing apparatus 100 and a user terminal 150 are connected to each other through a communication line.

In general, secure sockets layer (SSL)/transport layer security (TLS) is used in order to ensure communication security.

SSL/TLS is based on a "public key infrastructure" (PKI) and ensures security, using an electronic certificate issued by a certificate authority that is one of components forming the PKI.

This exemplary embodiment relates to the treatment of an electronic certificate, and more particularly, to an electronic certificate of a certificate authority (hereinafter, referred to as a CA certificate).

The information processing apparatus 100 may be an apparatus that can perform communication (particularly, SSL/TLS communication). In addition, the information processing apparatus 100 may be an apparatus that is used by plural persons and is managed by an administrator. For example, the information processing apparatus 100 is a copier, a facsimile, a scanner, a printer, or a multi-function machine (an image processing apparatus having one or two or more of the functions of a scanner, a printer, a copier, and a facsimile).

It is necessary to set (register or set up) a CA certificate of the certificate authority which has issued a server certificate used by a server in the information processing apparatus 100 in order to accurately perform the SSL/TLS communication between the information processing apparatus 100 and the server which is a communication device.

However, it is difficult for the administrator of the information processing apparatus 100 to accurately perform an operation of "setting the CA certificate in the information processing apparatus 100".

Therefore, this exemplary embodiment enables the administrator of the information processing apparatus 100 to accurately set the CA certificate in an easy-to-understand way.

SSL/TLS is used in order to perform communication between the information processing apparatus 100 and the communication device while ensuring security.

It is necessary to set an electronic certificate in the information processing apparatus 100 in order to use SSL/TLS.

When the information processing apparatus 100 performs SSL/TLS communication with the communication device (the information processing apparatus 100 is a client and the communication device is a server and is hereinafter referred to as a server), the information processing apparatus 100 needs to receive an electronic certificate that is presented by the server (generally referred to as a server certificate) and to verify the content of the electronic certificate.

It is necessary to set the certificate of the certificate authority that issues the server certificate as an electronic certificate (CA certificate) of a reliable certificate authority in the information processing apparatus 100 so that the information processing apparatus 100 can verify the server certificate.

It is necessary to set the CA certificate in the information processing apparatus 100. However, it is difficult for the administrator of the information processing apparatus 100 to set the CA certificate for the following reasons. (1) The administrator needs to know the communication destinations of all of the functions of the information processing apparatus 100 used. For example, the functions include a function of transmitting a scanned image to the communication device according to a file transfer protocol (FTP) (Scan To FTP), a function of performing communication with a mail server, and services (customized services) desired by each user.

In particular, for example, in Scan To FTP, in some cases, the information processing apparatus 100 communicates with a PC of a user and it is difficult for the administrator to know all of the communication destinations. (2) It is necessary to acquire the CA certificate of each communication destination.

A high level of expertise is needed in order to manage the electronic certificate. Therefore, in many cases, the administrator of the information processing apparatus 100 has no knowledge of the CA certificate. In this case, it is difficult to acquire the CA certificate. (3) A high level of expertise in the certificate is needed in order to verify whether the acquired CA certificate is correct.

Therefore, in this exemplary embodiment, when the verification of the server certificate fails in the information processing apparatus 100, it is possible to set the CA certificate in the information processing apparatus 100, using the verification result of the user terminal 150.

The information processing apparatus 100 includes a certificate processing module 105, a verification failure information storage module 120, a certificate storage module 125, a web module 130, and a communication module 145.

The communication module 145 is connected to the web module 130 and is also connected to a communication module 155 of the user terminal 150 through the communication line. The communication module 145 performs communication with the user terminal 150.

The certificate processing module 105 includes a certificate verification module 110 and a certificate setting module 115. The certificate processing module 105 performs a process related to the electronic certificate.

The certificate verification module 110 is connected to the verification failure information storage module 120. The certificate verification module 110 verifies a first electronic certificate (server certificate). For example, when a process is performed based on an operation of the user and communication with the server occurs, it is necessary to verify the first electronic certificate transmitted from the server. As described above, it is necessary to set a second certificate of the certificate authority that has issued the first electronic certificate in advance in order to verify the first electronic certificate. However, the second certificate is not necessarily set in the information processing apparatus 100 for the above-mentioned reasons. When the second certificate is not set in the information processing apparatus 100, the verification of the first electronic certificate fails. When the verification fails, information about the failure is stored in the verification failure information storage module 120. Examples of the information about the failure include the first certificate, the second certificate, and information indicating that verification has failed. When the second certificate corresponding to the first certificate is set in the information processing apparatus 100, the verification succeeds. The information processing apparatus 100 may use the certification verification module 110 to perform the verification using the method according to the related art.

The verification failure information storage module 120 is connected to the certificate verification module 110 and a verification failure information presentation module 135. When the verification result of the certificate verification module 110 indicates failure, the verification failure information storage module 120 stores information about the failure. As described above, examples of the information about the failure include the first certificate, the second certificate, and information indicating that verification has failed.

The web module 130 includes the verification failure information presentation module 135 and a certificate receiving module 140 and is connected to the communication module 145. When the user terminal 150 accesses the web module 130, the web module 130 performs communication through a web page.

The verification failure information presentation module 135 is connected to the verification failure information storage module 120. The verification failure information presentation module 135 generates an instruction for the user terminal 150 used by the administrator of the information processing apparatus 100 to verify the first electronic certificate (server certificate) of which the verification has failed. An example of the instruction is an instruction for the user terminal 150 to verify the first electronic certificate using, for example, JavaScript (registered trademark). In particular, the verification may be performed using an electronic certificate in a certificate repository that can be accessed by a browser module 160 of the user terminal 150.

The verification failure information presentation module 135 transmits the instruction and information indicating the first electronic certificate to the user terminal 150 through the communication module 145.

When the verification of the first electronic certificate fails, the verification failure information presentation module 135 may notify the administrator of the information processing apparatus 100 that verification has failed. Examples of the notification may include notification using electronic mail, a chat, an electronic bulletin board, or social media, and any push notification is preferable as the examples of the notification. In addition, the content of the notification may include the uniform resource locator (URL) of an access destination.

The certificate receiving module 140 is connected to the certificate storage module 125. The certificate receiving module 140 receives an instruction to set the second electronic certificate (CA certificate) from the user terminal 150 through the communication module 145. Then, the certificate receiving module 140 stores the setting instruction in the certificate storage module 125. In addition, the certificate receiving module 140 may receive the second electronic certificate from the user terminal 150.

The certificate storage module 125 is connected to the certificate setting module 115 and the certificate receiving module 140. The certificate storage module 125 stores the instruction to set the second electronic certificate.

The certificate setting module 115 is connected to the certificate storage module 125. When an instruction to set the second electronic certificate (CA certificate) is received from the user terminal 150, the certificate setting module 115 sets the second electronic certificate. When the second electronic certificate is received from the user terminal 150, the certificate setting module 115 may set the second electronic certificate. Then, when the first electronic certificate corresponding to the set second certificate is verified, it is determined that the verification has succeeded.

The user terminal 150 includes the communication module 155 and the browser module 160. The user terminal 150 is used by the administrator of the information processing apparatus 100.

The communication module 155 is connected to the browser module 160 and is also connected to the communication module 145 of the information processing apparatus 100 through the communication line. The communication module 155 performs communication with the information processing apparatus 100.

The browser module 160 includes a presentation module 165, a certificate verification module 170, and a registration instruction module 175 and is connected to the communication module 155. The browser module 160 displays web pages which are transmitted from the information processing apparatus 100 through the communication module 155 on, for example, a liquid crystal display and transmits instructions to the information processing apparatus 100.

The presentation module 165 is connected to the certificate verification module 170 and the registration instruction module 175. The presentation module 165 receives an instruction (for the user terminal 150 to verify the electronic certificate) and information indicating the first electronic certificate from the information processing apparatus 100.

Then, the presentation module 165 presents the information indicating the first electronic certificate and the verification result of the certificate verification module 170. The content of the presentation will be described below using the example illustrated in FIG. 7.

The certificate verification module 170 is connected to the presentation module 165 and the registration instruction module 175. The certificate verification module 170 verifies the first electronic certificate based on the instruction received by the presentation module 165. The information processing apparatus 100 may use the certification verification module 110 to perform the verification using the method according to the related art. The user terminal 150 is used by the administrator and is provided with the browser module 160 that functions as a web browser. Therefore, in general, the number of electronic certificates of the certificate authorities set in the user terminal 150 is greater than that set in the information processing apparatus 100. For example, in many cases, the electronic certificates of some certificate authorities are implemented in the web browser in advance. Of course, electronic certificates other than the implemented electronic certificates may be set. The certificate verification module 170 verifies the first electronic certificate transmitted from the information processing apparatus 100, using the electronic certificate of the certificate authority. Here, the electronic certificates (electronic certificates in the certificate repository) set in the user terminal 150 include a CA certificate and a server certificate. Since the CA certificate has a hierarchical structure, it may include a CA certificate of a certificate authority in an intermediate layer, in addition to a CA certificate of a root certificate authority.

The registration instruction module 175 is connected to the presentation module 165 and the certificate verification module 170. The registration instruction module 175 transmits an instruction to set the second electronic certificate used to verify the first electronic certificate to the information processing apparatus 100 through the communication module 155 in response to the operation of the administrator.

Figure 2:
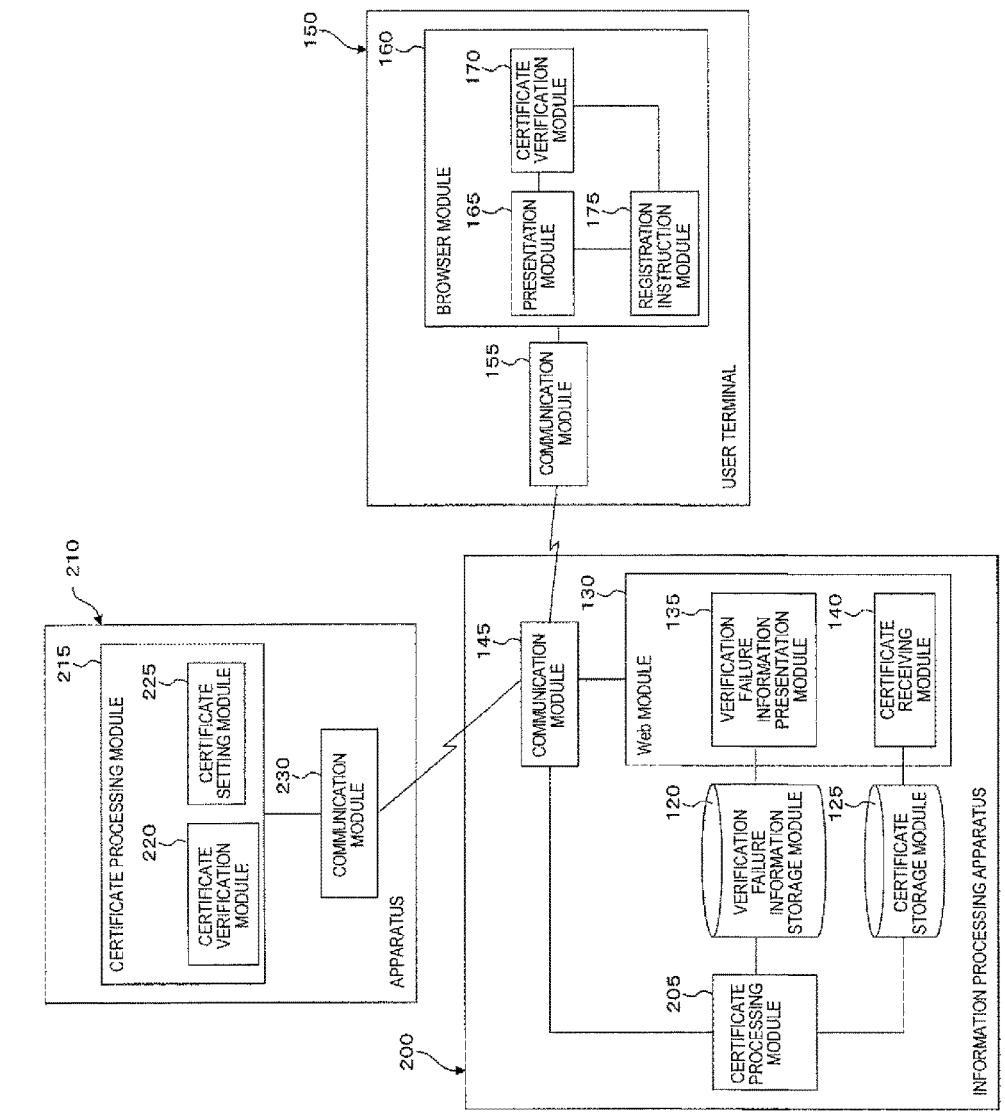
FIG. 2 is a conceptual diagram illustrating an example of the structure of modules according to this exemplary embodiment.

FIG. 2 is a conceptual diagram illustrating an example of the structure of modules according to this exemplary embodiment. In the example illustrated in FIG. 1, each information processing apparatus 100 has the functions of the certificate processing module 105 and the web module 130. However, an apparatus 210 has the functions of a certificate processing module 215 (corresponding to the certificate processing module 105) and an information processing apparatus 200 has the functions of the web module 130. The information processing apparatus 200 receives the result of failure in verification from plural apparatuses 210 and provides the result to the user terminal 150.

The information processing apparatus 200 includes a certificate processing module 205, the verification failure information storage module 120, the certificate storage module 125, the web module 130, and the communication module 145. The information processing apparatus 200 has the functions of a so-called web server.

The certificate processing module 205 is connected to the verification failure information storage module 120, the certificate storage module 125, and the communication module 145. The certificate processing module 205 receives information indicating failure in the verification of the first electronic certificate from the apparatus 210 through the communication module 145. Then, the certificate processing module 205 transmits an instruction to set the second electronic certificate from the user terminal 150 to the apparatus 210 through the communication module 145.

The verification failure information storage module 120 is connected to the certificate processing module 205 and the verification failure information presentation module 135.

The certificate storage module 125 is connected to the certificate processing module 205 and the certificate receiving module 140.

The web module 130 includes the verification failure information presentation module 135 and the certificate receiving module 140 is connected to the communication module 145.

The verification failure information presentation module 135 is connected to the verification failure information storage module 120.

The certificate receiving module 140 is connected to the certificate storage module 125.

The communication module 145 is connected to the certificate processing module 205 and the web module 130 and is also connected to the communication module 155 of the user terminal 150 and a communication module 230 of the apparatus 210 through communication lines. The communication module 145 performs communication with the user terminal 150 and the apparatus 210.

The user terminal 150 includes the communication module 155 and the browser module 160.

The communication module 155 is connected to the browser module 160 and is also connected to the communication module 145 of the information processing apparatus 200 through the communication line.

The browser module 160 includes the presentation module 165, the certificate verification module 170, and the registration instruction module 175 and is connected to the communication module 155.

The presentation module 165 is connected to the certificate verification module 170 and the registration instruction module 175.

The certificate verification module 170 is connected to the presentation module 165 and the registration instruction module 175.

The registration instruction module 175 is connected to the presentation module 165 and the certificate verification module 170.

The apparatus 210 includes a certificate processing module 215 and the communication module 230. The apparatus 210 is used by plural persons. For example, the apparatus 210 is a copier, a facsimile, a scanner, a printer, or a multi-function machine.

The certificate processing module 215 includes a certificate verification module 220 and a certificate setting module 225 and is connected to the communication module 230. The certificate processing module 215 has the same functions as the certificate processing module 105.

The certificate verification module 220 has the same functions as the certificate verification module 110.

The certificate setting module 225 has the same functions as the certificate setting module 115.

The communication module 230 is connected to the certificate processing module 215 and is connected to the communication module 145 of the information processing apparatus 200 through the communication line. The communication module 230 performs communication with the information processing apparatus 200.

Figure 3:
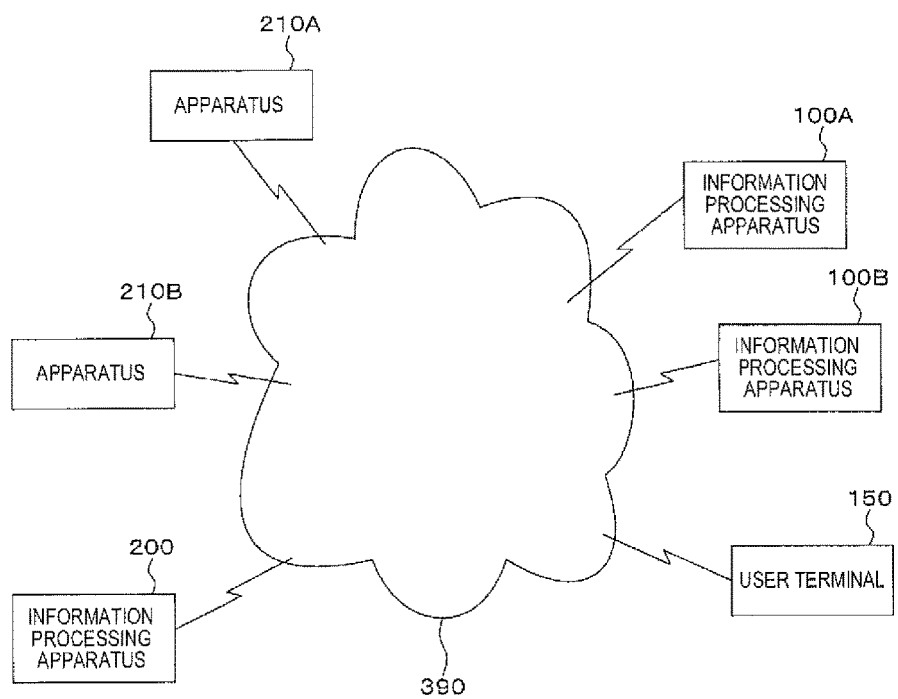
FIG. 3 is a diagram illustrating an example of the structure of a system using this exemplary embodiment.

FIG. 3 is a diagram illustrating an example of the structure of a system using this exemplary embodiment.

An information processing apparatus 100A, an information processing apparatus 100B, the user terminal 150, the information processing apparatus 200, an apparatus 210A, and an apparatus 210B are connected to one another through a communication line 390. The communication line 390 may be a wireless network, a wired network, or a combination thereof. For example, the communication line may be the Internet or intranet as a communication infrastructure. In addition, the functions of the information processing apparatus 200 may be implemented as cloud services.

When the information processing apparatus 100A and the information processing apparatus 100E fail in the verification of the server certificate, information related to the failure is transmitted to the user terminal 150 and the user terminal 150 verifies the server certificate. The user terminal 150 receives an instruction to set a CA certificate corresponding to the server certificate in response to an operation of the administrator and sets the CA certificate.

When the apparatus 210A and the apparatus 210B fail in the verification of the server certificate, information related to the failure is transmitted to the information processing apparatus 200 and the information processing apparatus 200 transmits the information to the user terminal 150. The user terminal 150 verifies the server certificate. The user terminal 150 receives an instruction to set a CA certificate corresponding to the server certificate in response to an operation of the administrator and sets the CA certificate in the apparatus 210A and the apparatus 210B. For example, even if only the apparatus 210A fails in the verification of the server certificate, the CA certificate may be set in both the apparatus 210A and the apparatus 210B.

Figure 4:
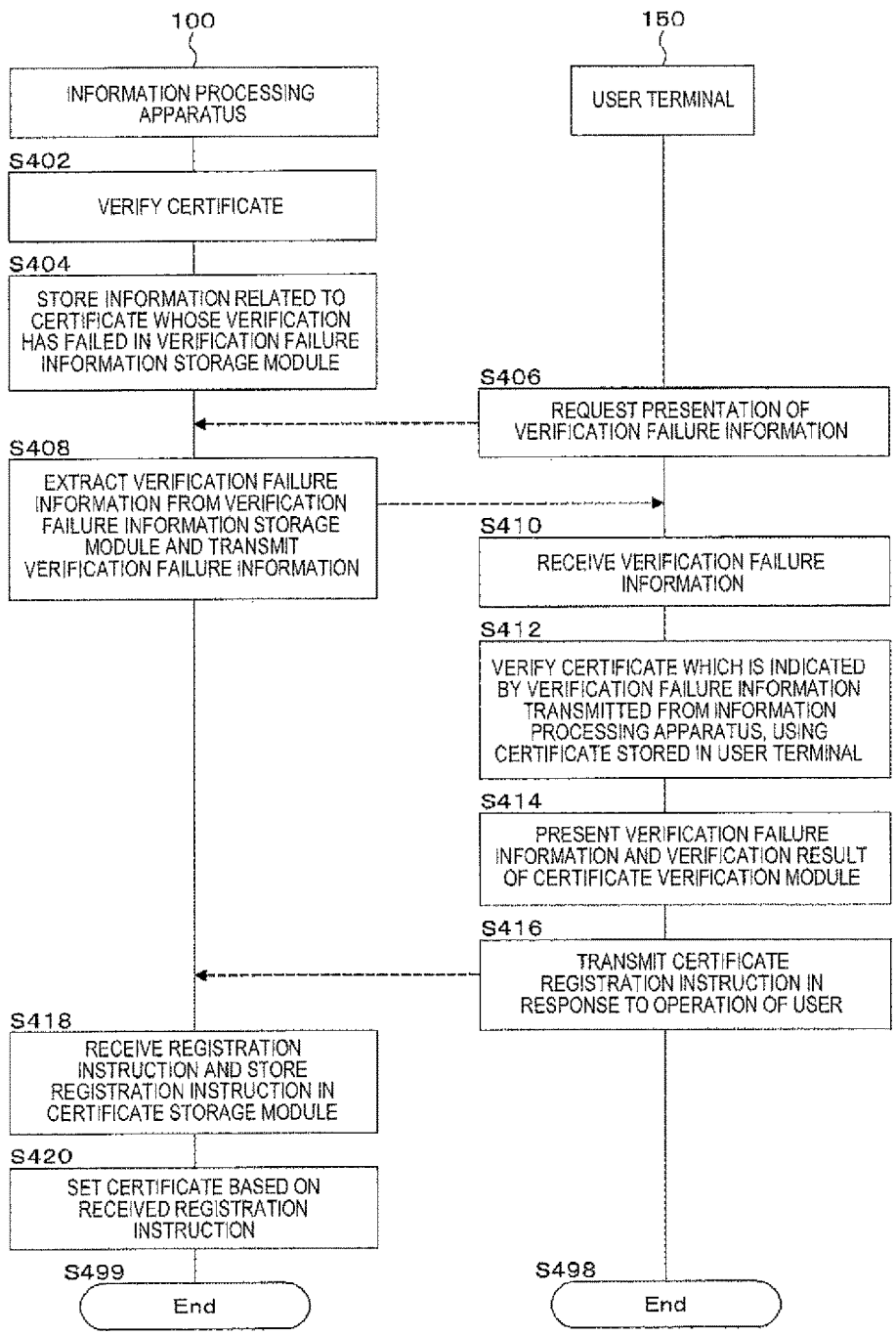
FIG. 4 is a flowchart illustrating an example of a process according to this exemplary embodiment.

FIG. 4 is a flowchart illustrating an example of a process according to this exemplary embodiment illustrated in FIG. 1.

In Step S402, the certificate verification module 110 verifies a certificate (server certificate).

In Step S404, the certificate verification module 110 stores information about the certificate (server certificate) whose verification has failed in the verification failure information storage module 120.

In Step S406, the presentation module 165 requests the information processing apparatus 100 to present verification failure information. The request may be issued periodically (for example, at an interval of a week) or by an instruction from the user of the user terminal 150 (the administrator of the information processing apparatus 100).

In Step S408, the verification failure information presentation module 135 extracts the verification failure information from the verification failure information storage module 120 and transmits the verification failure information to the user terminal 150. The verification failure information also includes an instruction for the user terminal 150 to verify the certificate (server certificate) whose verification has failed.

In Step S410, the presentation module 165 receives the verification failure information.

In Step S412, the certificate verification module 170 verifies the certificate (server certificate) which is indicated by the verification failure information transmitted from the information processing apparatus 100, using the certificate stored in the user terminal 150. For example, the verification is performed using the electronic certificate in the certificate repository.

In Step S414, the presentation module 165 presents the verification failure information and the verification result of the certificate verification module 170.

In Step S416, the registration instruction module 175 transmits an instruction to register the certificate (CA certificate) to the information processing apparatus 100 in response to an operation of the user. For example, the user selects the certificate whose verification has succeeded in Step S412 and issues an instruction to register the certificate (CA certificate).

In Step S418, the certificate receiving module 140 receives the registration instruction and stores the registration instruction in the certificate storage module 125.

In Step S420, the certificate setting module 115 sets the certificate (CA certificate) in response to the received registration instruction.

FIG. 5 is a flowchart illustrating an example of a process according to this exemplary embodiment illustrated in FIG. 1.

The flowchart illustrated in FIG. 5 differs from the flowchart illustrated in FIG. 4 in that Step S506 is added and Step S508 is performed instead of Step S406.

In Step S502, the certificate verification module 110 verifies a certificate (server certificate).

In Step S504, the certificate verification module 110 stores information about the certificate (server certificate) whose verification has failed in the verification failure information storage module 120.

In Step S506, the information processing apparatus notifies the user terminal 150 that the verification of the certificate (server certificate) has failed.

In Step S508, the user terminal 150 requests the information processing apparatus 100 to present verification failure information based on the content of the notification.

In Step S510, the verification failure information presentation module 135 extracts the verification failure information from the verification failure information storage module 120 and transmits the verification failure information to the user terminal 150. The verification failure information also includes an instruction for the user terminal 150 to verify the certificate (server certificate) whose verification has failed.

In Step S512, the presentation module 165 receives the verification failure information.

In Step S514, the certificate verification module 170 verifies the certificate (server certificate) which is indicated by the verification failure information transmitted from the information processing apparatus 100, using the certificate stored in the user terminal 150.

In Step S516, the presentation module 165 presents the verification failure information and the verification result of the certificate verification module 170.

In Step S518, the registration instruction module 175 transmits an instruction to register the certificate (CA certificate) in the information processing apparatus 100 in response to an operation of the user.

In Step S520, the certificate receiving module 140 receives the registration instruction and stores the registration instruction in the certificate storage module 125.

In Step S522, the certificate setting module 115 sets the certificate (CA certificate) in response to the received registration instruction.

FIGS. 6A and 6B are diagrams illustrating an example of a process according to this exemplary embodiment. Specifically, FIGS. 6A and 6B illustrate an operation screen when the information processing apparatus 100 or the apparatus 210 transmits a scanned image to a server "scan.ffffxxxxx.com".

As illustrated in FIG. 6A, for example, "Scanning is available, [Storage destination] ¥¥scan.ffffxxxxx.com¥scan¥scan, [Protocol] SMB" is displayed on a scanned document storage setting screen 600. For example, "Server: scan.ffffxxxxx.com, Shared name: scan, Storage location: scan, User name: user, Password: ****" is displayed on a scanner PC storage tab 610.

When the server certificate of the server "scan.ffffxxxxx-.com" is verified and the verification fails (when a CA certificate corresponding to the server certificate is not set), the scanned image is not transmitted and a message illustrated in FIG. 6B is displayed. For example, "Security is temporarily allowed: An invalid certificate was notified. Do you want to temporarily perform communication with a valid certificate? "Yes" "No"" is displayed on a verification failure screen 650. That is, communication is temporarily allowed since the verification of the server certificate has failed. Of course, a message indicating that transmission is not available may be displayed.

FIG. 7 is a diagram illustrating an example of a process according to this exemplary embodiment. Specifically, FIG. 7 illustrates content presented by the presentation module 165 of the user terminal 150 (the web page provided by the information processing apparatus 100 or the information processing apparatus 200).

An occurrence date and time field 710, an operator field 720, a function field 730, a certificate issuer field 740, a certificate information field 750, a PC browser verification result field 760, and a registration instruction field 770 are displayed on a verification failure information presentation screen 700. The fields from the occurrence date and time field 710 to the certificate information field 750 are information transmitted from the information processing apparatus 100 or the information processing apparatus 200.

The date and time when the verification of the server certificate failed (year, month, day, hour, minute, second, sub-second, or combinations thereof) are displayed in the occurrence date and time field 710. The operator of the information processing apparatus 100 or the information processing apparatus 200 when verification failure occurs is displayed in the operator field 720. A function (operation) when verification failure occurs is displayed in the function field 730. The issuer of the server certificate or the CA certificate is displayed in the certificate issuer field 740. Information about the server certificate or the CA certificate is displayed in the certificate information field 750. The verification result of the certificate verification module 170 is displayed in the PC browser verification result field 760. Specifically, the certificate verification module 170 verifies the certificate using, for example, JavaScript and the verification result is displayed. The registration instruction field 770 has "registration" buttons for each row (failure in the verification of the server certificate). When the "registration" button is selected, the CA certificate in the user terminal 150 is set in the information processing apparatus 100 or the information processing apparatus 200.

The administrator checks information from the occurrence date and time field 710 to the PC browser verification result field 760 and performs an operation 790 of pressing the "registration" button in the registration instruction field 770. In particular, since the information of the PC browser verification result field 760 displayed, it is easy to determine whether to register the verification result in the information processing apparatus 100 or the information processing apparatus 200, as compared to the case in which the information of the PC browser verification result field 760 is not provided. When the user terminal 150 succeeds in verifying the certificate (that is, since the certificate is trusted by the browser module 160 of the user terminal 150), the certificate can be used as an important material that is determined to be set in the information processing apparatus 100 or the information processing apparatus 200.

FIGS. 8A and 8B are diagrams illustrating an example of a process according to this exemplary embodiment. Specifically, FIGS. 8A and 8B illustrate an operation screen when the information processing apparatus 100 or the apparatus 210 transmits a scanned image to a server "scan.ffffxxxxx-.com" after the "registration" button is selected in the verification failure information presentation screen 700 illustrated in FIG. 7 (when the same operation as that illustrated in FIGS. 6A and 6B is performed).

The content of a scanned document storage setting screen 600 illustrated in FIG. 8A is the same as the content of the scanned document storage setting screen 600 illustrated in FIG. 6A.

Since the CA certificate corresponding to the server certificate has already been set in the information processing apparatus 100 or the information processing apparatus 200, the verification of the server certificate succeeds and a verification and connection success screen 850 illustrated in FIG. 8B is displayed. For example, "Storage destination: confidential box 001-(name unset), Document name: 20150625140908" is displayed as the transmission result of the scanned image on the verification and connection success screen 850.

Figure 9:
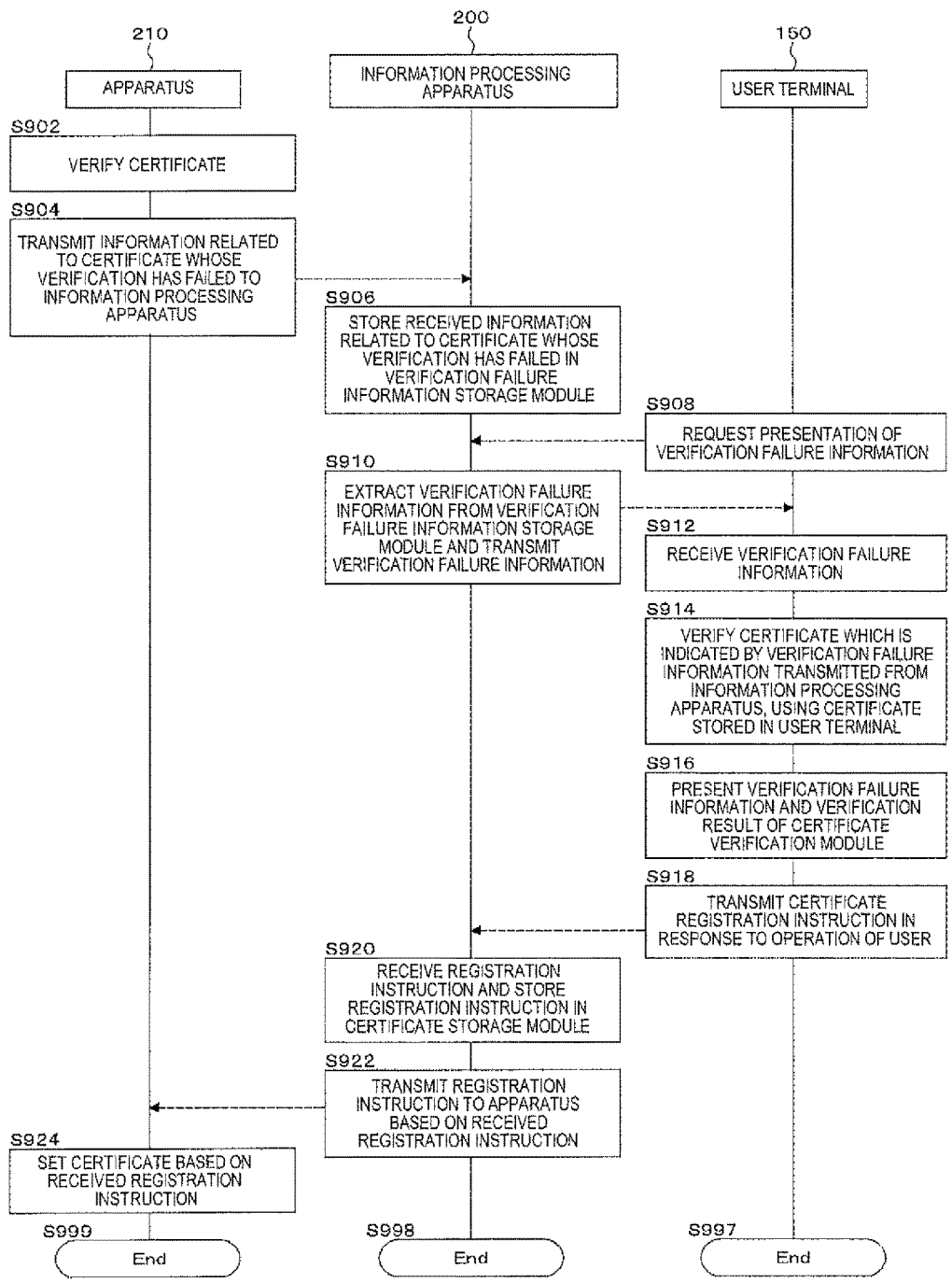
FIG. 9 is a flowchart illustrating an example of a process according to this exemplary embodiment.

FIG. 9 is a flowchart illustrating an example of a process according to this exemplary embodiment illustrated in FIG. 2.

In Step S902, the certificate verification module 220 verifies a certificate (server certificate).

In Step S904, the certificate verification module 220 transmits information related to the certificate (server certificate) whose verification has failed to the information processing apparatus 200.

In Step S906, the certificate processing module 205 stores the received information related to the certificate (server certificate) whose verification has failed in the verification failure information storage module 120.

In Step S908, the presentation module 165 requests the information processing apparatus 200 to present verification failure information.

In Step S910, the verification failure information presentation module 135 extracts the verification failure information from the verification failure information storage module 120 and transmits the verification failure information to the user terminal 150. The verification failure information includes an instruction for the user terminal 150 to verify the certificate (server certificate) whose verification has failed.

In Step S912, the presentation module 165 receives the verification failure information.

In Step S914, the certificate verification module 170 verifies the certificate (server certificate) which is indicated by the verification failure information transmitted from the information processing apparatus 200, using the certificate stored in the user terminal 150.

In Step S916, the presentation module 165 presents the verification failure information and the verification result of the certificate verification module 170.

In Step S918, the registration instruction module 175 transmits an instruction to register the certificate (CA certificate) to the information processing apparatus 200 in response to an operation of the user.

In Step S920, the certificate receiving module 140 receives the registration instruction and stores the registration instruction in the certificate storage module 125.

In Step S922, the registration instruction is transmitted to the apparatus 210 based on the received registration instruction.

In Step S924, the certificate setting module 225 sets the certificate (CA certificate) in response to the received registration instruction.

In Step S922, the registration instruction may be transmitted to other apparatuses 210, in addition to the apparatus 210 that has transmitted the information in Step S904. Therefore, even if the certificate (server certificate) has not been verified, it is possible to set the certificate (CA certificate). When the apparatuses 210 are grouped, the registration instruction may be transmitted to the apparatuses 210 belonging to the same group as the apparatus 210 that has transmitted the information in Step S904.

Figure 10:
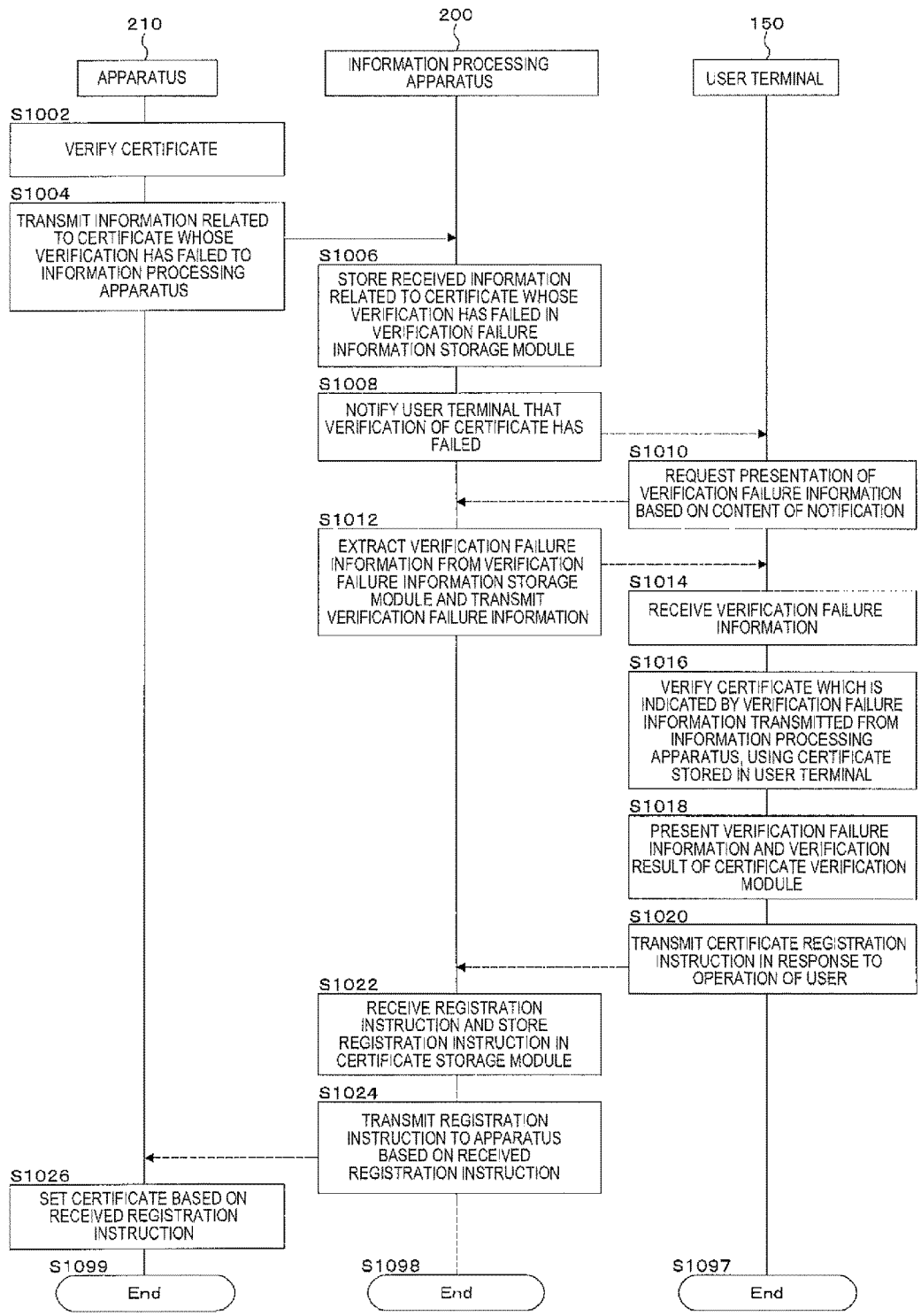
FIG. 10 is a flowchart illustrating an example of a process according to this exemplary embodiment.

FIG. 10 is a flowchart illustrating an example of a process according to this exemplary embodiment illustrated in FIG. 2.

The flowchart illustrated in FIG. 10 differs from the flowchart illustrated in FIG. 9 in that Step S1008 is added and Step S1010 is performed instead of Step S908.

In Step S1002, the certificate verification module 220 verifies a certificate (server certificate).

In Step S1004, the certificate verification module 220 transmits information related to the certificate (server certificate) whose verification has failed to the information processing apparatus 200.

In Step S1006, the certificate processing module 205 stores the received information related to the certificate (server certificate) whose verification has failed in the verification failure information storage module 120.

In Step S1008, the information processing apparatus 200 notifies the user terminal 150 that the verification of the certificate has failed.

In Step S1010, the presentation module 165 requests the information processing apparatus 200 to present verification failure information based on the content of the notification.

In Step S1012, the verification failure information presentation module 135 extracts the verification failure information from the verification failure information storage module 120 and transmits the verification failure information to the user terminal 150. The verification failure information includes an instruction for the user terminal 150 to verify the certificate (server certificate) whose verification has failed.

In Step S1014, the presentation module 165 receives the verification failure information.

In Step S1016, the certificate verification module 170 verifies the certificate (server certificate) which is indicated by the verification failure information transmitted from the information processing apparatus 200, using the certificate stored in the user terminal 150.

In Step S1018, the presentation module 165 presents the verification failure information and the verification result of the certificate verification module 170.

In Step S1020, the registration instruction module 175 transmits an instruction to register the certificate (CA certificate) to the information processing apparatus 200 in response to an operation of the user.

In Step S1022, the certificate receiving module 140 receives the registration instruction and stores the registration instruction in the certificate storage module 125.

In Step S1024, the registration instruction is transmitted to the apparatus 210 based on the received registration instruction.

In Step S1026, the certificate setting module 225 sets the certificate (CA certificate) in response to the received registration instruction.

Figure 11:
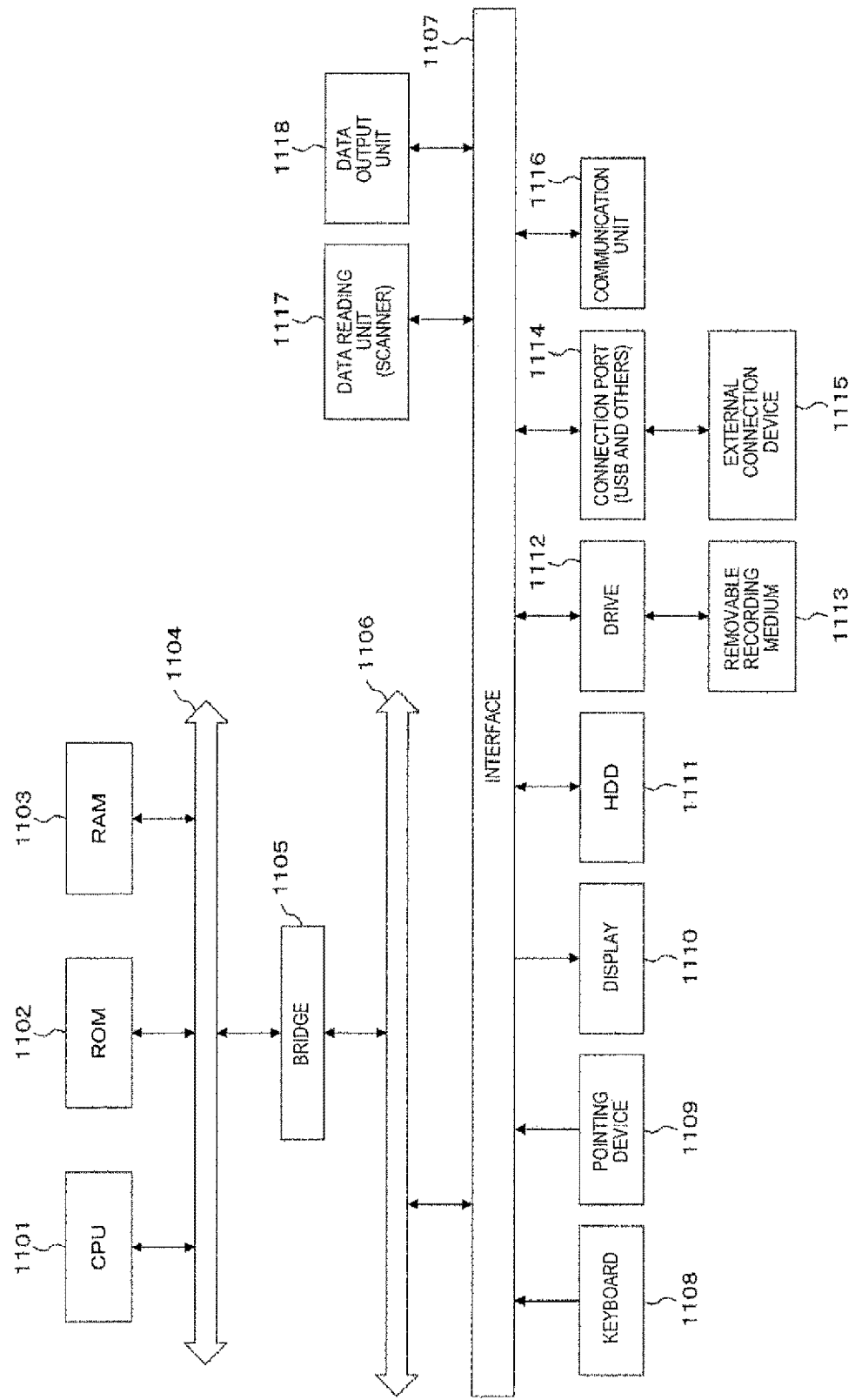
FIG. 11 is a block diagram illustrating an example of the hardware configuration of a computer that implements this exemplary embodiment.

An example of the hardware configuration of the information processing apparatus (the information processing apparatus 100, the information processing apparatus 200, the user terminal 150, or the apparatus 210) according to this exemplary embodiment will be described with reference to FIG. 11. The configuration illustrated in FIG. 11 is implemented by, for example, a personal computer (PC). FIG. 11 illustrates an example of a hardware configuration including a data reading unit 1117, such as a scanner, and a data output unit 1118, such as a printer.

A central processing unit (CPU) 1101 is a control unit that performs processes based on a computer program in which the execution sequence of various modules described in the above-described embodiment, such as the certificate processing module 105, the certificate verification module 110, the certificate setting module 115, the web module 130, the verification failure information presentation module 135, the certificate receiving module 140, the communication module 145, the communication module 155, the browser module 160, the presentation module 165, the certificate verification module 170, the registration instruction module 175, the certificate processing module 215, the certificate verification module 220, the certificate setting module 225, the communication module 230, and the certificate processing module 205, is described.

A read only memory (ROM) 1102 stores programs or operation parameters used by the CPU 1101. A random access memory (RAM) 1103 stores, for example, programs that are used in the execution of the CPU 1101 or parameters that are appropriately changed in the execution. These components are connected to each other by a host bus 1104 which is, for example, a CPU bus.

The host bus 1104 is connected to an external bus 1106, such as a peripheral component interconnect/interface (PCI) bus, through a bridge 1105.

A keyboard 1108 and a pointing device 1109, such as a mouse, are devices that are operated by an operator. A display 1110 is, for example, a liquid crystal display or a cathode ray tube (CRT) and displays various kinds of information as text or image information. For example, the display may be a touch screen having the functions of both the pointing device 1109 and the display 1110.

A hard disk drive (HDD) 1111 has a hard disk (which may be, for example, a flash memory) provided therein. The hard disk is driven to store or reproduce the program or information executed by the CPU 1101. The hard disk functions as, for example, the verification failure information storage module 120 and the certificate storage module 125. In addition, the hard disk stores, for example, various kinds of data and various computer programs.

A drive 1112 reads data or a program recorded in a removable recording medium 1113, such as a magnetic disk, an optical disk, a magneto-optical disk, or a semiconductor memory that is inserted into the drive 1112, and supplies the data or program to the RAM 1103 through an interface 1107, the external bus 1106, the bridge 1105, and the host bus 1104. The removable recording medium 1113 can be used as a data recording area.

A connection port 1114 is a port for connecting an external connection device 1115 and has a connection portion, such as a USB terminal or an IEEE 1394 terminal. For example, the connection port 1114 is connected to the CPU 1101 through the interface 1107, the external bus 1106, the bridge 1105, and the host bus 1104. A communication unit 1116 is connected to the communication line and performs data communication with the outside. A data reading unit 1117 is, for example, a scanner and performs a document reading process. A data output unit 1118 is, for example, a printer and performs a document data output process.

The hardware configuration of the information processing apparatus illustrated in FIG. 11 is illustrative and this exemplary embodiment is not limited to the configuration illustrated in FIG. 11. Any configuration may be used as long as the modules described in this exemplary embodiment can be implemented. For example, some modules may be dedicated hardware components (for example, an application specific integrated circuit (ASIC)) and some modules may be provided in an external system and may be connected to the information processing apparatus through a communication line. In addition, plural systems illustrated in FIG. 11 may be connected to each other by a communication line so as to operate in cooperation with each other. In particular, the information processing apparatus may be incorporated into, for example, portable information communication devices (including mobile phones, smart phones, mobile devices, and wearable computers), information appliances, robots, copiers, facsimiles, scanners, printers, and multi-function machines, in addition to the personal computer.

In the above-mentioned example, the CA certificate is registered in the information processing apparatus 100 or the information processing apparatus 200. However, the CA certificate may be a self-signed server certificate. That is, the second electronic certificate may be a CA certificate or a self-signed server certificate.

In general, a reliable CA certificate is stored in a certificate repository, such as a web browser, in advance. The CA certificate can be applied to this exemplary embodiment.

In many cases, a self-signed server certificate is registered in the user terminal 150 in advance. Therefore, even if the self-signed server certificate is used, this exemplary embodiment can be applied.

The above-described program may be stored in a recording medium and then provided. In addition, the program may be provided by a communication unit. In this case, for example, the above-described program may be considered as a "computer readable recording medium having a program recorded thereon".

The "computer readable recording medium having a program recorded thereon" means a recording medium that has a program recorded thereon, can be read by a computer, and is used to, for example, install, execute, and distribute the program.

Examples of the recording medium include digital versatile disks (DVDs), such as "DVR-R, DVD-RW, and DVD-RAM" which are a standard specified by DVD Forum and "DVD+R and DVD+RW" which are a standard specified as DVD+RW, compact disks (CDs), such as a CD read only memory (CD-ROM), CD recordable (CD-R), and CD rewritable (CD-RW), a Blu-ray (registered trademark) disc, a magneto-optical disk (MO), a flexible disk (FD), a magnetic tape, a hard disk, a read only memory (ROM), an electrically erasable programmable read only memory (EE-PROM (registered trademark)), a flash memory, a random access memory (RAM), and a secure digital (SD) memory card.

A portion of or the entire program may be recorded on the recording medium and then retained or distributed. In addition, the program may be transmitted by communication using, for example, a transmission medium, such as a wired network which is used for a local area network (LAN), a metropolitan area network (MAN), a wide area network (WAN), the Internet, an intranet, an extranet, and the like, a wireless communication network, or a combination thereof. Furthermore, the programs may be carried on carrier waves.

The above-described program may partially or entirely form other programs, or may be recorded on a recording medium along with individual programs. In addition, the program may be divided and recorded on plural recording media. The program may be recorded in any format as long as it can be restored. For example, the program may be compressed or encoded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
an information processing apparatus; and
a terminal,
wherein the information processing apparatus includes:
a generator that generates an instruction for the terminal used by an administrator of the information processing apparatus to verify a first electronic certificate whose verification has failed;
a transmitter that transmits information indicating the first electronic certificate and the instruction to the terminal used by the administrator of the information processing apparatus; and
a setting unit that, when an instruction to set a second electronic certificate is received from the terminal, sets the second electronic certificate, and
the terminal includes:
a receiver that receives the information indicating the first electronic certificate and the instruction from the information processing apparatus;
a verification unit that verifies the first electronic certificate based on the instruction;
a presentation unit that presents the information indicating the first electronic certificate and a verification result of the verification unit; and
a transmitter that transmits the instruction to set the second electronic certificate used to verify the first electronic certificate to the information processing apparatus in response to an operation of the administrator.

2. The information processing system according to claim 1, wherein the information processing apparatus includes a notification unit that, when the verification of the first electronic certificate fails, notifies the administrator that the verification of the first electronic certificate has failed.

3. A non-transitory computer readable recording medium storing:
an information processing program that causes a computer to function as:
a generator that generates an instruction for a terminal used by an administrator of an information processing apparatus including the computer to verify a first electronic certificate whose verification has failed;
a transmitter that transmits information indicating the first electronic certificate and the instruction to the terminal used by the administrator of the information processing apparatus;
a setting unit that, when an instruction to set a second electronic certificate is received from the terminal, sets the second electronic certificate; and an information processing program that causes the terminal to function as:
- a receiver that receives the information indicating the first electronic certificate and the instruction from the computer;
- a verification unit that verifies the first electronic certificate based on the instruction;
- a presentation unit that presents the information indicating the first electronic certificate and a verification result of the verification unit; and
- a transmitter that transmits the instruction to set the second electronic certificate used to verify the first electronic certificate to the computer in response to an operation of the administrator.

4. The non-transitory computer readable recording medium according to claim 3, wherein the information processing program causes the computer to function as a notification unit that, when the verification of the first electronic certificate fails, notifies the administrator that the verification of the first electronic certificate has failed.

* * * * *